United States Patent
Cancellieri et al.

(10) Patent No.: US 9,964,062 B2
(45) Date of Patent: May 8, 2018

(54) METHOD OF OPERATING A FUEL INJECTOR OF AN INTERNAL COMBUSTION ENGINE

(71) Applicant: GM GLOBAL TECHNOLOGY OPERATIONS LLC, Detroit, MI (US)

(72) Inventors: Angelo Cancellieri, Turin (IT); Paul Leonardo Claude, Turin (IT)

(73) Assignee: GM GLOBAL TECHNOLOGY OPERATIONS LLC, Detroit (*) Notice: Subject to any disclaimer, the term of this patent is extended or adjusted under 35 U.S.C. 154(b) by 29 days.

(21) Appl. No.: 15/298,896

(22) Filed: Oct. 20, 2016

(65) Prior Publication Data

US 2017/0107928 A1    Apr. 20, 2017

(30) Foreign Application Priority Data

Oct. 20, 2015   (GB) .................................. 1518551.5

(51) Int. Cl.
F02D 41/00    (2006.01)
F02D 41/24    (2006.01)
F02D 41/20    (2006.01)

(52) U.S. Cl.
CPC ......... F02D 41/2467 (2013.01); F02D 41/20 (2013.01); F02D 41/2432 (2013.01); F02D 2041/2055 (2013.01)

(58) Field of Classification Search
CPC ............. F02D 41/2467; F02D 41/2477; F02D 41/248; F02D 41/2432; F02D 2041/2055
See application file for complete search history.

(56) References Cited

U.S. PATENT DOCUMENTS 7,881,857 B2 *   2/2011   Samenfink ........ F02D 41/1454
                                                         123/299
8,290,687 B2 *  10/2012   Olbrich ............. F02D 41/2438
                                                         123/299

(Continued)

FOREIGN PATENT DOCUMENTS

| JP | 2009293552 A | 12/2009 |
| JP | 2014181672 A | 9/2014 |
| WO | 2013107559 A1 | 7/2013 |

OTHER PUBLICATIONS

Great Britain Patent Office, Great Britain Combined Search and Examination Report for Great Britain Application No. 1518551.5, dated May 3, 2016.

*Primary Examiner* — Thomas Moulis
(74) *Attorney, Agent, or Firm* — Lorenz & Kopf LLP (57) ABSTRACT

A first test injection of a fuel injector is performed with a first test Energizing Time and the actual fuel quantity injected is measured to obtain a first point of a characteristic curve representing a relationship between the injector Energizing Time and the fuel quantity which is actually injected. A ratio between the actual fuel quantity injected and a nominal fuel quantity corresponding to the first test Energizing Time is calculated and used to determine a plurality of corrected Energizing Times for subsequent test injections. The subsequent test injections are performed using the corrected Energizing Times and the actual fuel quantity that has been injected during each one of the subsequent test injections is measured to obtain further points of the characteristic curve. The characteristic curve of the fuel injector is modeled based on the obtained further points and used to control the operation of the fuel injector.

11 Claims, 4 Drawing Sheets

(56) References Cited

U.S. PATENT DOCUMENTS

| | | | | |
|---|---|---|---|---|
| 8,306,719 B2* | 11/2012 | Ishizuka | F02D 43/02 | |
| | | | 123/456 | |
| 8,935,114 B2* | 1/2015 | Beer | F02D 41/20 | |
| | | | 123/90.11 | |
| 9,458,791 B2* | 10/2016 | Park | F02D 41/38 | |
| 9,599,062 B2* | 3/2017 | Van Nieuwstadt | F02D 41/247 | |
| 9,689,342 B2* | 6/2017 | Ranga | F02D 41/402 | |
| 9,840,981 B2* | 12/2017 | Brandt | F02D 41/2432 | |
| 2003/0041843 A1* | 3/2003 | Shinogle | F02D 41/2467 | |
| | | | 123/486 | |
| 2004/0158384 A1 | 8/2004 | Kuegel et al. | | |
| 2008/0077306 A1* | 3/2008 | Kloppenburg | F02D 41/2422 | |
| | | | 701/104 | |
| 2009/0024307 A1* | 1/2009 | Bohnig | F02D 41/2416 | |
| | | | 701/104 | |
| 2009/0063019 A1* | 3/2009 | Yamada | F02D 41/22 | |
| | | | 701/104 | |
| 2009/0063020 A1* | 3/2009 | Ishizuka | F02D 41/2438 | |
| | | | 701/104 | |
| 2009/0114035 A1* | 5/2009 | Lehnert | F02M 65/00 | |
| | | | 73/861 | |
| 2011/0120423 A1* | 5/2011 | Borchsenius | F02D 41/008 | |
| | | | 123/494 | |
| 2011/0137541 A1* | 6/2011 | Malikopoulos | F02D 41/1406 | |
| | | | 701/106 | |
| 2011/0202255 A1* | 8/2011 | Hauser | F02D 41/008 | |
| | | | 701/103 | |
| 2012/0041666 A1* | 2/2012 | Kemmer | F02D 41/0085 | |
| | | | 701/104 | |
| 2012/0158268 A1* | 6/2012 | Nakata | F02D 41/2467 | |
| | | | 701/103 | |
| 2013/0024098 A1* | 1/2013 | Li | F02D 41/1497 | |
| | | | 701/104 | |
| 2014/0216409 A1* | 8/2014 | Katsura | F02D 41/3809 | |
| | | | 123/456 | |
| 2014/0311457 A1* | 10/2014 | Christ | F02D 41/30 | |
| | | | 123/478 | |
| 2014/0343826 A1* | 11/2014 | Gueguen | F02D 41/2438 | |
| | | | 701/104 | |
| 2015/0053179 A1* | 2/2015 | Baqasse | F02D 41/2467 | |
| | | | 123/435 | |
| 2015/0088402 A1 | 3/2015 | Girotto et al. | | |
| 2015/0192086 A1* | 7/2015 | Gutscher | F02D 41/2432 | |
| | | | 123/478 | |

* cited by examiner

FIG.5 ic curve using a linear regression formula based on the obtained points. However, the above described method may be affected by non-linearity errors if the level of injector's drift or fault is high with respect to the test injection.

METHOD OF OPERATING A FUEL INJECTOR OF AN INTERNAL COMBUSTION ENGINE

CROSS-REFERENCE TO RELATED APPLICATION

This application claims priority to Great Britain Patent Application No. 1518551.5, filed Oct. 20, 2015, which is incorporated herein by reference in its entirety.

TECHNICAL FIELD

The present disclosure pertains to a method of operating a fuel injector of an internal combustion engine.

BACKGROUND

Conventional internal combustion engines may be equipped with fuel injectors used to provide fuel to the cylinders of the engine, under control of an Electronic Control Unit (ECU). The operation of an injector is controlled by means of a nominal characteristic curve correlating Energizing Time values with corresponding injected Fuel Quantity values.

In practice, the ECU determines the fuel quantity to be injected by the fuel injector, reads from the nominal characteristic curve a corresponding value of the energizing time and finally operates the fuel injector with that energizing time. This nominal curve is referred to a sample injector, operating in nominal conditions and generally such curve is supplied by the injector's manufacturer.

Especially in case of small quantity fuel injections, such as for example pilot injections, the quantity of fuel actually injected by a fuel injector may deviate from a target or nominal quantity thereof defined by the nominal curve, due to production drift or to ageing drift of the injector.

Learning control methods are known to obviate to such issue, such as Small Quantity Adjustment learning (SQA), which is a method aimed to determine an actual characteristic curve of the fuel injector, which can be used instead of the nominal curve to operate the injector at least while performing small fuel injections. These learning control methods generally provides for operating the injector to perform a number of test fuel injections having different predetermined energizing times, of measuring an actual quantity of fuel injected during each one of the test injections to obtain a corresponding point of the actual characteristic curve, and finally of modelling the actual characteristic curve using a linear regression formula based on the obtained points. However, the above described method may be affected by non-linearity errors if the level of injector's drift or fault is high with respect to the test injection.

Accordingly, it is desirable to provide a strategy that improves the determination of an actual characteristic curve of a fuel injector, avoiding non-linearity errors.

SUMMARY

An embodiment of the disclosure provides a method of operating a fuel injector of an internal combustion engine in which a first test injection is performed with a first test Energizing Time. An actual fuel quantity that has been injected during the first test injection is measured to obtain a first point of a characteristic curve representing a relationship between the Energizing Time applied to the injector and the fuel quantity which is actually injected by the injector. A ratio is calculated between the actual fuel quantity injected and a nominal fuel quantity corresponding to the first test Energizing Time. The calculated ratio is used to determine a plurality of corrected Energizing Times for subsequent test injections. Subsequent test injections are performed using the corrected Energizing Times. The actual fuel quantity that has been injected during each one of the subsequent test injections is measured to obtain further points of the characteristic curve. The characteristic curve of the fuel injector is modelled on the basis of the obtained further points. The characteristic curve is used to control the operation of the fuel injector. An advantage of this embodiment is that it calculates points of the actual characteristic curve that are within a linearity domain of the curve itself and use such cure in the actual operations of the engine.

According to another embodiment of the present disclosure, the nominal fuel quantity is determined using a nominal characteristic curve correlating the first test Energizing Time to the nominal fuel quantity. An advantage of this embodiment is that it allows a known starting point for the determination of the actual characteristic curve of the fuel injector.

According to another embodiment of the present disclosure, each one of the corrected Energizing Times may be determined by determining an Energizing Time offset on the basis of the calculated ratio, and adding the Energizing Time offset to a correspondent and predetermined test Energizing Time.

According to a further embodiment, the Energizing Time offset is determined using a calibration map correlating the calculated ratio with the Energizing Time offset. An advantage of these last two embodiments is that they allow to determine the most appropriate corrected Energizing Times for each curve that is estimated ensuring that subsequent test points after the first test point lie inside the linearity domain of the actual characteristic curve of the injector.

According to another embodiment, the characteristic curve of the fuel injector is modeled using a linear regression formula. An advantage of this embodiment is that it allows to estimate actual characteristic curve by known means once a plurality of points of the curve have been determined inside a linearity domain of the curve itself.

According to another aspect of the present disclosure, the first injection point is used in the modelling of the characteristic curve of the fuel injector, if the actual fuel quantity that has been injected during the first test injection is larger than a first predetermined threshold. According to another aspect of the present disclosure, the first injection point is used in the modelling of the characteristic curve of the fuel injector, if the actual fuel quantity that has been injected during the first test injection is smaller than a second predetermined threshold. An advantage of these two embodiments is that they avoid introducing non-linearity errors in the estimation of the actual characteristic curve of the fuel injector.

Another aspect of the present disclosure provides an apparatus for operating a fuel injector of an internal combustion engine, the apparatus is configured to perform a first test injection with a first test Energizing Time, measure an actual fuel quantity that has been injected during the first test injection to obtain a first point of a characteristic curve representing a relationship between the Energizing Time applied to the injector and the fuel quantity which is actually injected by the injector, calculate a ratio between the actual fuel quantity injected and a nominal fuel quantity corresponding to the first test Energizing Time, use the calculated ratio to determine a plurality of corrected Energizing Times for subsequent test injections, perform the subsequent test injections using the corrected Energizing Times, measure the actual fuel quantity that has been injected during each one of the subsequent test injections to obtain further points of the characteristic curve, model the characteristic curve of the fuel injector on the basis of the obtained further points, and use the characteristic curve to control the operation of the fuel injector. This aspect has similar effects with respect to the previous embodiment, namely it calculates points of the actual characteristic curve that are within a linearity domain of the curve itself.

According to another aspect of the present disclosure, the apparatus is further configured to determine the nominal fuel quantity using a nominal characteristic curve correlating the first test Energizing Time to the nominal fuel quantity. An advantage of this aspect is that it allows a known starting point for the determination of the actual characteristic curve of the fuel injector.

According to another aspect of the present disclosure, the apparatus is further configured to determine each one of the corrected Energizing Times by determining an Energizing Time offset on the basis of the calculated ratio and means for adding the Energizing Time offset to a correspondent and predetermined test Energizing Time.

According to a further aspect, the apparatus is further configured to determine the Energizing Time offset using a calibration map correlating the calculated ratio with the Energizing Time offset. An advantage of these last two aspects that they allow to determine the most appropriate corrected Energizing Times for each curve that is estimated ensuring that subsequent test points after the first test point lie inside the linearity domain of the actual characteristic curve of the injector.

According to still another aspect of the present disclosure, the apparatus is further configured to model the actual characteristic curve of the fuel injector by means of a linear regression formula. An advantage of this aspect is that it allows to estimate actual characteristic curve by known means once a plurality of points of the curve have been determined inside a linearity domain of the curve itself.

According to a further aspect of the present disclosure, the apparatus is further configured to determine the Energizing Time offsets for the subsequent test injections using a calibrated map correlating the calculated ratio with the Energizing Time offset for different test injections. An advantage of this aspect is that, once the calibrated map is determined by an experimental activity performed on a plurality of injectors, it ensures that subsequent test points after the first test point lie inside the linearity domain of the actual characteristic curve of the injector.

According to another aspect of the present disclosure, the apparatus is further configured to use the first injection point in the modelling of the characteristic curve of the fuel injector, if the actual fuel quantity that has been injected during the first test injection is larger than a first predetermined threshold. According to another aspect of the present disclosure, the apparatus is further configured to use the first injection point the modelling of the characteristic curve of the fuel injector, if the actual fuel quantity that has been injected during the first test injection is smaller than a second predetermined threshold. An effect of these two aspects is that they avoid introducing non-linearity errors in the estimation of the actual characteristic curve of the fuel injector.

The method according to one of its aspects can be carried out with the help of a computer program including a program-code for carrying out all the steps of the method described above, and in the form of computer program product including the computer program. The computer program product can be embodied as a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
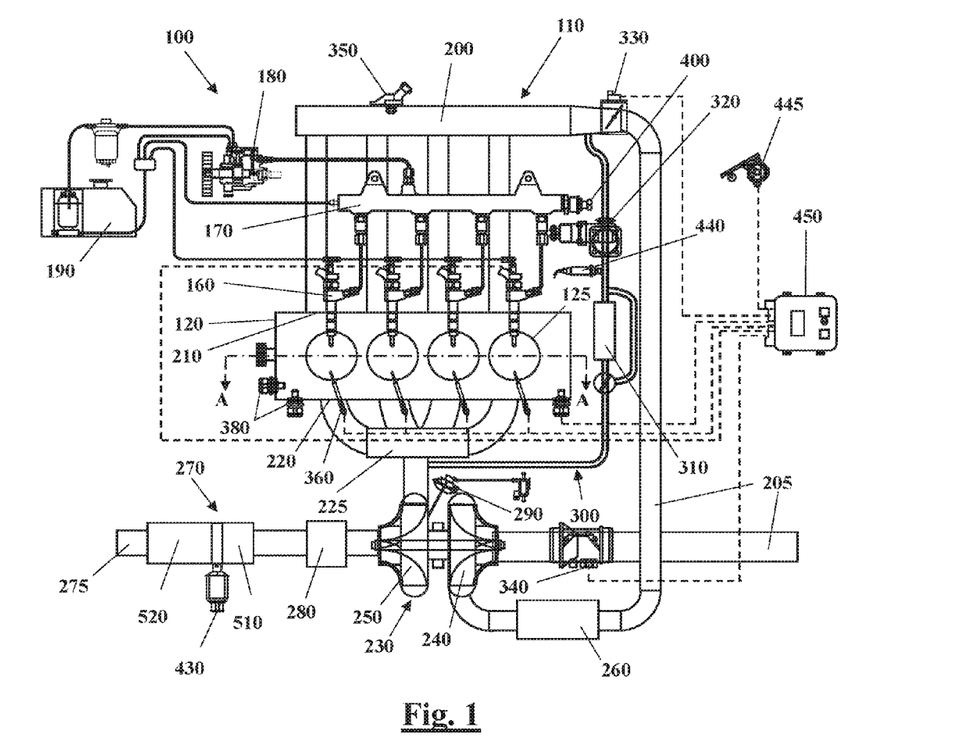
FIG. 1 shows an automotive system.
Figure 2:
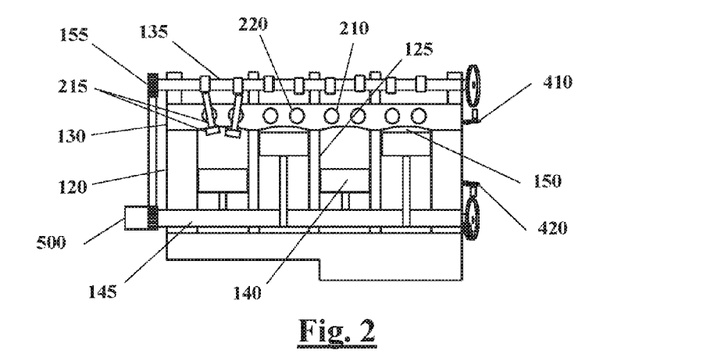
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an aftertreatment system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The aftertreatment system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters, such as a Diesel Particulate Filter (DPF).

Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a Wi-Fi connection to a laptop.

In case of a non-transitory computer program product, the computer program code is embodied in a tangible computer-readable storage medium. The storage medium is then the non-transitory carrier mentioned above, such that the computer program code is permanently or non-permanently stored in a retrievable way in or on this storage medium. The storage medium can be of a conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
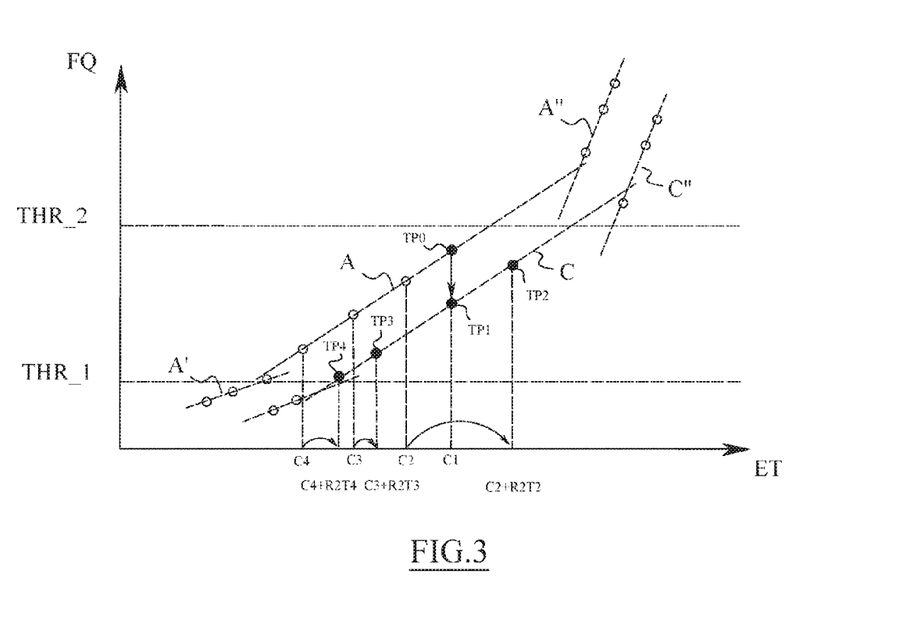
FIG. 3 shows a graph representing an estimation of an actual characteristic curve of a fuel injector, according to an embodiment of the present disclosure.
Figure 4:
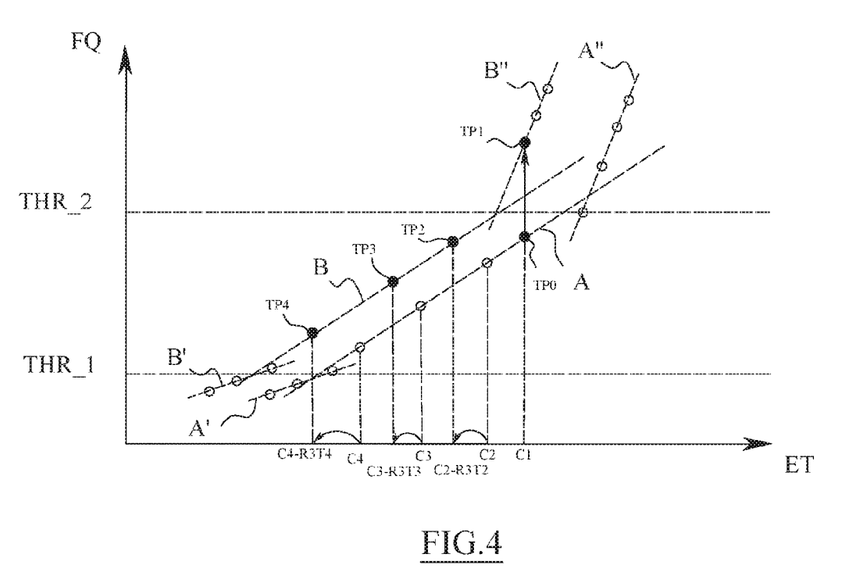
FIG. 4 shows a graph representing another estimation of an actual characteristic curve of a fuel injector.

FIGS. 3 and 4 a curve A is shown that represents a nominal characteristic curve of a fuel injector 160. As is known, the nominal characteristic curve of an injector is a curve correlating Energizing Time values with corresponding nominal injected Fuel Quantity values. The nominal characteristic curve is referred to a sample injector, operating in nominal conditions, and generally such curve is known and is supplied by the injector's manufacturer.

In other words, for each rail pressure, the nominal characteristic curve (such as curve A) represents the nominal fuel quantity injected by the injector 160 as a function of a respective Energizing Time Cx applied to the injector, namely of the amount of time the injector 160 is commanded to be open by the ECU 450.

It is known that injectors are subject to production spread and ageing, namely phenomena that lead to possible drift of actual vs. nominal injected quantity for a certain Energizing Time Cx. These phenomena may be expressed, for example, by actual characteristic curves B and C. In particular, curve C (FIG. 3) represents an actual characteristic curve of an injector that systematically injects less than a nominal injector for a given rail pressure and curve B (FIG. 4) represents an actual characteristic curve of an injector that systematically injects more than a nominal injector for a given rail pressure.

Since it is not possible to measure directly injected quantity on a running engine during normal use of the vehicle, it is known to use indirect methods to estimate the actual injected quantity by correlating the actual injected quantity with a measurable signal. Examples of measurable signals are: crankshaft acceleration, $O_2$ concentration, in-cylinder pressure and others. In order to implement the various embodiments of the method, it is therefore assumed that the actual injected quantity is estimated by any of the known methods.

The nominal characteristic curve is used during operation of the injector 160 to determine actual Energizing Times to be applied to the injector 160 as a function of the Fuel Quantities desired for each injection to be performed. Since, as stated above, for small injections the nominal characteristic curve may not be reliable, the actual characteristic curve of the fuel injector 160 may be estimated. In this regard, it has been experimentally determined that a restricted area of linearity of the injector characteristic curves A, B and C may be defined between a lower predetermined threshold THR_1 and a higher predetermined threshold THR_2.

In other words, both nominal and actual characteristic curves A, B and C are considered to be linear in the range included between the lower predetermined threshold THR_1 and the higher predetermined threshold THR_2. Non-linearity regions A' and A" for the nominal injector characteristic curves and B', B", C' and C" for the actual injector characteristic curves are also represented in FIGS. 3-4 as external to the region defined by the lower predetermined threshold THR_1 and the higher predetermined threshold THR_2. Both the lower predetermined threshold THR_1 and the higher predetermined threshold THR_2 may be determined experimentally as detailed hereinafter.

Moreover, the various embodiments of the method are implemented by starting each time with no information available about actual tested injector drift amount at the beginning of a characteristic curve estimation. The estimation procedure duration is preferably pre-determined in order to pass or fail diagnostic test using the same number of injections despite drift or fault amount. Therefore, in order to perform any of the various embodiments of the method, a predetermined number of test points TP0-TPn is chosen, namely the method according to the various embodiments of the present disclosure is performed for a predetermined number of test injections.

Each test point TPi may be defined as a set including a value of Energizing Time Cx and the corresponding actual value of Fuel Quantity Rx injected. Once the test points TPi have been determined, a regression law may be applied to such test points TPi in order to estimate the actual characteristic curve B, C of a fuel injector 160. Any regression method known in the art to estimate a linear relationship between known points may be used, such as the least squares regression method.

Still referring to FIG. 3, an exemplary embodiment of the present disclosure is now described. In the embodiment of FIG. 3, four test injection are performed, considering that an advantage of the method discussed herein is that a limited number of test injections are necessary for the estimation of the actual characteristic curve C of a fuel injector 160.

At the start of the test, a first test injection with a first Energizing Time C1 is performed and, as a consequence of this first test injection, an actual fuel quantity injected R1 is measured using one of the known methods for determining the actual fuel quantity injected, namely by analysis of available signals such as crankshaft acceleration, O2 concentration, in-cylinder pressure or others. In this fashion, a first test point TP1 is determined in the plane Energizing Time-Fuel Quantity.

The first test injection must be actuated with an Energizing Time C1 magnitude that would always cause a measurable system response, even in case of faulted system. In other words, the first injection Energizing Time C1 is calculated in such a way that would always cause a measurable actual fuel quantity injected R1, even in case of a faulted system exhibiting a performance that is worse than Best Performance Unacceptable (BPU).

If the actual quantity injected R1 differs from a nominal fuel quantity FQ_nom that would be predicted by the nominal characteristic curve A for the energizing time C1, a ratio Ratio_x between the actual fuel quantity injected R1 in the first test injection and the nominal fuel quantity FQ_nom determined by means of the nominal characteristic curve A of the fuel injector 160 for the Energizing Time C1 is calculated. The value of ratio Ratio_x is also memorized for further use in the method.

In graphical terms of FIG. 3, the point defined by Energizing Time C1 and by the corresponding nominal fuel quantity injected FQ_nom is represented as point TP0 on curve A. Since, in the example of FIG. 3, the tested injector 160 injects less that the nominal injector first test point TP1 is directly below point TP0 on curve A and may be considered a first known point of actual characteristic curve C for the tested injector 160. Then the calculated ratio Ratio_x is used to determine Energizing Time offsets RxTy for subsequent test injections.

In the case of FIG. 3, the calculated ratio Ratio_x is less than 1, meaning that the tested injector injects less with respect to a nominal injector, and Energizing Time offsets RxTy for subsequent test injections are added to nominal and Energizing Time values Cx for such injections. The Energizing Time offsets RxTy for the subsequent test injections are determined using a calibrated map correlating the calculated ratio Ratio_x with the Energizing Time offsets RxTy for different test injections. Such map can be exemplified by the following Table 1:

TABLE 1

|  | Test Point 2 | Test Point 3 | Test Point 4 | . . . |
| --- | --- | --- | --- | --- |
| Ratio 1 | R1T2 | R1T3 | R1T4 | . . . |
| Ratio 2 | R2T2 | R2T3 | R2T4 | . . . |
| Ratio 3 | R3T2 | R3T3 | R3T4 | . . . |
| Ratio 4 | R4T2 | R4T3 | R4T4 | . . . |
| . . . | . . . | . . . | . . . | . . . |

If, for example, the calculated ratio between the actual fuel quantity injected R1 in the first test injection and the nominal fuel quantity FQ_nom determined by means of the nominal characteristic curve A of the fuel injector 160 for the same Energizing Time C1 is equal to the value Ratio 2 in Table 1, such map is used to calculate Energizing Time offsets R2T2, R2T3 and R2T4 on the row corresponding to the value Ratio 2 for each of the subsequent injection to be performed. Energizing Time offsets R2T2, R2T3 and R2T4 are then respectively added to the Energizing Time values C2, C3 and C4 used for determining further points on the actual characteristic curve C of injector 160. In particular, Energizing Time values C2, C3 and C4 are predetermined test Energizing Time values that correspond to nominal Fuel Quantity values in a linearity zone of the nominal curve A.

All the Energizing Time offsets RxTy of Table 1 are determined by an experimental activity, as better detailed hereinafter, and are used to ensure that the actual values of the determined test points TPi are included inside the linearity domain of curve C that is defined by the lower predetermined threshold THR_1 and the higher predetermined threshold THR_2.

In the special case that the first test point TP1 lies outside such linearity domain, applying the Energizing Time offsets RxTy to subsequent test injections ensure that correspondent subsequent test points TPi lay inside the linearity domain. In this special case, as will be explained below, the first test point TP1 is not considered in the calculation of the linear regression formula. Then a second injection is performed with a corrected Energizing Time C2+R2T2 and a second test point TP2 of curve C is determined. After each subsequent test injection is performed, a first check is made to verify if a predetermined number of test injections have been performed. If the answer to the first check is negative, another test injection is performed, in order to calculate the subsequent test points TP3 and TP4 in the example of FIG. 3.

Once all test points TP1-TP4 have been determined they can be used in a linear regression formula to estimate actual characteristic curve C of injector 16.

Referring now to the embodiment of FIG. 4, four test injections are also performed, as an example of an embodiment of the method discussed herein. In the case of FIG. 4, a first test point TP1 that is determined by performing a first test injection with a first Energizing Time C1 and measuring an actual fuel quantity injected R1 lies in a region of the plane Energizing Time-Fuel Quantity which is above the second predetermined threshold THR_2 while the nominal point on the nominal characteristic curve A for Energizing Time C1 and corresponding nominal fuel quantity injected FQ_nom is represented as point TP0 on curve A.

Therefore, in this case, test point TP1 lies in a non-linearity region of actual characteristic curve B for the tested injector 160 and will be disregarded in the estimation of the actual characteristic curve B of the fuel injector 160 in order to avoid the introduction of non-linearity errors in the estimation. The same will happen if the first test point TP1 lies in a region of the plane Energizing Time Fuel Quantity lower than the first predetermined threshold THR_1, namely in another non-linearity region of actual characteristic curve B.

In the example of FIG. 4, the tested injector injects more that the nominal injector and the first test point TP1 of curve B is directly over point TP0 of curve A. In the case of FIG. 4, the calculated ratio Ratio_x is greater than 1, meaning that the tested injector injects more with respect to a nominal injector, and Energizing Time offsets RxTy for subsequent test injections are therefore added to nominal and Energizing Time values Cx for such injections. In this case, however, the offsets RxTy have values that are less than zero (i.e. negative values).

If, for example, the calculated ratio between the nominal fuel quantity FQ_nom determined by means of the nominal characteristic curve A of the fuel injector 160 for the same Energizing Time C1 is Ratio 3, Energizing Time offsets R3T2, R3T3 and R3T4 for each of the subsequent injection to be performed are read from the row corresponding to the value Ratio 3 of Table 1 and added in the subsequent injections to the respective Energizing Time values C2, C3 and C4 used to calibrate the nominal characteristic curve A of injector 160. Once all test points TP2-TP4 have been determined, they can be used in a linear regression formula to estimate actual characteristic curve B of injector 160.

Figure 5:
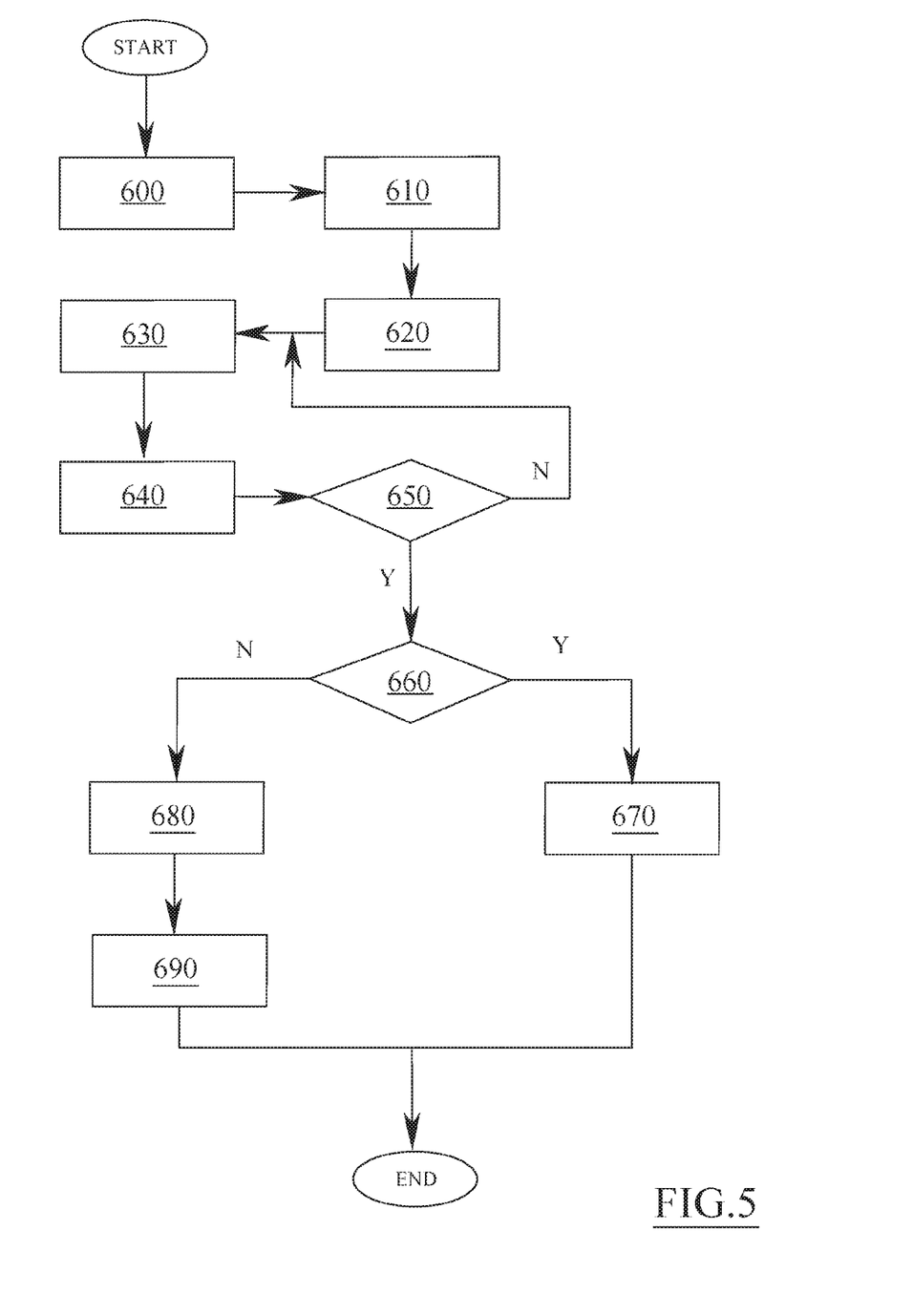
FIG. 5 is a flowchart representing an embodiment of the present disclosure.

FIG. 5 is a flowchart representing an embodiment of the present disclosure. At the start of the test, a first test injection with a first Energizing Time C1 is performed (block 600) and the actual fuel quantity injected R1 is measured (block 610). In this fashion a first test point TP1 is determined. If the actual quantity injected is different from the nominal fuel quantity, as expressed by the nominal characteristic curve A, a ratio Ratio_x between the actual fuel quantity injected R1 in the first test injection and a nominal fuel quantity FQ_nom determined by means of the nominal characteristic curve of the fuel injector 160 is calculated (block 620) and is also memorized for further use in the method. Then a map correlating the calculated ratio Ratio_x with the test injections is used to determine Energizing Time offsets RxTy for subsequent test injections (block 630). Such map can be exemplified by the above Table 1. Then a second injection is performed with a corrected Energizing Time C2+RxT2 (block 640).

After each subsequent test injection is performed, a first check is made to verify if a predetermined number of test injections have been performed (block 650). If the answer to the first check is negative, another test injection is performed, repeating the steps of blocks 630-640. If the answer to the first check is positive, a second check is performed in order to determine if the actual fuel quantity injected in the first test injection R1 is smaller than a first predetermined threshold THR_1 or is greater than a second predetermined threshold THR_2 (block 660).

If the answer to the second check is negative, the test point TP1=(C1, R1) is disregarded in the estimation by means of linear regression analysis of the actual characteristic curve of the fuel injector 160 (block 680). Then the actual characteristic curve of the fuel injector 160 is estimated by performing a linear regression analysis using the remaining calculated injection points (block 690). If the answer to the second check is positive, the actual characteristic curve of the fuel injector 160 is estimated by performing a linear regression analysis using the calculated injection points and also using the values of the first test point TP1=(C1,R1) (block 670).

The Energizing Time offsets RxTy contained in the map of Table 1 are numerical values that are determined by means of an experimental activity, considering that each actual injector, even if drifted or faulted, shall have an actual characteristic curve that is monotonic within the same validity domain for regression law in terms of system response.

The experimental activity firstly provides that a nominal characteristic curve is determined by testing a nominal injector in a plurality of injection points in order to define a domain in which a linear regression law is valid and to determine the nominal injector response to commands outside the validity domain. As an alternative, the nominal characteristic curve may be determined and supplied by the producer of the injectors. On the basis of such curve A, test points C2, C3 and C4 are chosen in the linearity domain of the nominal curve A. Then, the experimental activity may include a plurality of tests on several injectors that are affected with several different degrees of drift (different ratio Rx) from the nominal injector.

Each test provides for determining an actual characteristic curve of the corresponding injector and from such curve, considering the domain in which such curve may be considered linear, for determining corresponding offsets RxTy to be added to the preset test energizing time C2, C3 and C4 to guarantee that the test fuel injection are performed in the linear domain of the curve.

The correction offsets are finally stored in the map, where they are correlated to the drift degree (ratio Rx) of the corresponding fuel injector. Furthermore, also by considering the domain in which the actual characteristic curves of the fuel injectors may be considered linear, the values of the first predetermined threshold THR_1 and of the second predetermined threshold THR_2 may be determined.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating a fuel injector of an internal combustion engine comprising:
   performing a first test injection with a first test Energizing Time;
   measuring an actual fuel quantity that has been injected during the first test injection to obtain a first point of a characteristic curve representing a relationship between the Energizing Time applied to the injector and the fuel quantity which is actually injected by said injector;
   calculating a ratio between the actual fuel quantity injected and a nominal fuel quantity corresponding to the first test Energizing Time;
   using the calculated ratio to determine a plurality of corrected Energizing Times for subsequent test injections;
   performing the subsequent test injections using the corrected Energizing Times;
   measuring the actual fuel quantity that has been injected during each one of the subsequent test injections to obtain further points of the characteristic curve;
   modelling the characteristic curve of the fuel injector on the basis of the obtained further points;
   controlling the operation of the fuel injector using the characteristic curve.

2. The method according to claim 1, wherein the nominal fuel quantity is determined using a nominal characteristic curve correlating the first test Energizing Time to the nominal fuel quantity.

3. The method according to claim 1, wherein each one of the corrected Energizing Times is determined by:
   determining an Energizing Time offset on the basis of the calculated ratio; and
   adding the Energizing Time offset to a correspondent and predetermined test Energizing Time.

4. The method according to claim 3, wherein the Energizing Time offset is determined using a calibration map correlating the calculated ratio with the Energizing Time offset.

5. The method according to claim 1, wherein the characteristic curve of the fuel injector is modeled using a linear regression formula.

6. The method according to claim 1, wherein the first injection point is used in the modelling of the characteristic curve of the fuel injector, if the actual fuel quantity that has been injected during the first test injection is larger than a first predetermined threshold.

7. The method according to claim 1, wherein the first injection point is used in the modelling of the characteristic curve of the fuel injector, if the actual fuel quantity that has been injected during the first test injection is smaller than a second predetermined threshold.

8. An automotive system comprising an electronic control unit configured to carry out the method according to claim 1.

9. A non-transitory computer readable medium comprising a computer-code, which when executed on a computer, performs the method to claim 1.

10. An apparatus for operating a fuel injector of an internal combustion engine apparatus comprising an electronic control unit configured to:
    perform a first test injection with a first test Energizing Time;
    measure an actual fuel quantity that has been injected during the first test injection to obtain a first point of a characteristic curve representing a relationship between the Energizing Time applied to the injector and the fuel quantity which is actually injected by said injector;
    calculate a ratio between the actual fuel quantity injected and a nominal fuel quantity corresponding to the first test Energizing Time;
    use the calculated ratio to determine a plurality of corrected Energizing Times for subsequent test injections;
    perform the subsequent test injections using the corrected Energizing Times;
    measure the actual fuel quantity that has been injected during each one of the subsequent test injections to obtain further points of the characteristic curve;
    model the characteristic curve of the fuel injector on the basis of the obtained further points; and
    control the operation of the fuel injector using the characteristic curve.

11. The apparatus according to claim 10 further comprising a non-transitory computer readable medium associated with the electronic control unit and including a computer program having programming instructions.

* * * * *